Patented Oct. 26, 1926.

1,604,472

UNITED STATES PATENT OFFICE.

DONALD ARCHER NIGHTINGALE, OF AMBLER, PENNSYLVANIA, ASSIGNOR TO THE KETOID COMPANY, OF WILMINGTON, DELAWARE, A CORPORATION OF DELAWARE.

METHOD OF MAKING ACETYL SALICYLIC ACID.

No Drawing. Application filed July 22, 1924, Serial No. 727,488. Renewed March 18, 1926.

My invention relates to the manufacture of the mono acetic acid ester of salicylic acid.

This substance, more usually known as acetyl salicylic acid (and to trade as aspirin) is commonly prepared from salicylic acid, acetic acid and acetic anhydride. The process is somewhat tedious in that it involves fractional crystallization, with its attendant losses.

The object of my invention is to provide a cheaper and more rapid method of manufacturing acetyl-salicylic acid of a high degree of purity, with a practically quantitative yield.

My invention is based on my discovery that keten when brought in contact with salicylic acid will effect a rapid esterification of the salicylic acid by direct addition and therefore without the formation of water of decomposition, which is a drawback to the old method, and my invention consists broadly speaking in the method of manufacturing acetyl salicylic acid by bringing keten into contact with salicylic acid.

The time required for this reaction is considerably shortened by the use of a mutual solvent. For example: A given quantity of salicylic acid is dissolved in about five times its weight of dry ethyl ether. Keten ($C_2H_2O$) is passed through the solution to the point of saturation. On evaporation of the ether there remains a mass of needle-like crystals of acetyl salicylic acid.

The reaction that takes place may be represented by the following equation:

$$C_7H_6O_3 + C_2H_2O = C_9H_8O_4.$$

Having now described my invention, what I claim as new and desire to secure by Letters Patent, is:

1. The method of manufacturing acetyl salicylic acid which comprises reacting upon salicylic acid with keten.

2. The method of manufacturing acetyl salicylic acid which comprises reacting upon salicylic acid with keten in the presence of a neutral solvent which is also a solvent of keten.

3. The method of manufacturing acetyl salicylic acid which consists in dissolving salicylic acid in a neutral solvent which is also a solvent of keten and passing keten gas through the solution.

DONALD A. NIGHTINGALE.